US011892317B2

United States Patent
Fowe

(10) Patent No.: US 11,892,317 B2
(45) Date of Patent: *Feb. 6, 2024

(54) AUTOMATIC DETECTION OF SEGMENT WIDTH NARROWING USING PROBE DATA

(71) Applicant: HERE GLOBAL B.V., Eindhoven (NL)

(72) Inventor: James Adeyemi Fowe, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,287

(22) Filed: Dec. 20, 2021

(65) Prior Publication Data

US 2023/0194300 A1 Jun. 22, 2023

(51) Int. Cl.
*G01C 21/00* (2006.01)
*G01C 21/30* (2006.01)
*G06F 16/906* (2019.01)

(52) U.S. Cl.
CPC ......... *G01C 21/3819* (2020.08); *G01C 21/30* (2013.01); *G01C 21/3841* (2020.08); *G06F 16/906* (2019.01)

(58) Field of Classification Search
CPC .............. G01C 21/3819; G01C 21/3841; G01C 21/30; G06F 16/906
See application file for complete search history.

(56) References Cited

U.S. PATENT DOCUMENTS

| 6,850,841 B1 * | 2/2005 | Casino | G01C 21/26 701/461 |
| 7,627,414 B2 | 12/2009 | Goto et al. | |

(Continued)

FOREIGN PATENT DOCUMENTS

| CN | 106289036 A | * | 1/2017 | ............... G01B 7/02 |
| CN | 108961758 A | | 12/2018 | |
| CN | 113447013 A | * | 9/2021 | |

OTHER PUBLICATIONS

Machine Translation of CN-113447013-A (Year: 2021).*

(Continued)

*Primary Examiner* — Faris S Almatrahi
*Assistant Examiner* — Sahar Motazedi
(74) *Attorney, Agent, or Firm* — ALSTON & BIRD LLP

(57) ABSTRACT

A method, apparatus and computer program product are provided to automatically detect changes in width of road segments in real-time or near real-time using probe data, such as probe data collected from vehicle and/or mobile devices traveling along a road segment. Probe data collected in real-time or near real-time is partitioned in order to identify width-defining portions of the probe data. The width-defining portions may be representative of the laterally-extreme lanes of the road segment, such as the left-most lane and the right-most lane. The width-defining portions are compared to corresponding width-defining portions of historical probe data to determine measures indicative of whether a road segment has expanded or narrowed. Indications of detected segment width changes may be provided to drivers and/or other systems or users. For example, map data for the road segment may be updated to reflect a detected width expansion or narrowing of the road segment.

17 Claims, 5 Drawing Sheets

(56) References Cited

U.S. PATENT DOCUMENTS

| | | | |
|---|---|---|---|
| 9,240,123 B2 | 1/2016 | Stenneth | |
| 10,140,856 B2 | 11/2018 | Bernhardt et al. | |
| 2012/0095682 A1* | 4/2012 | Wilson | G01C 21/3841 701/532 |
| 2015/0170514 A1 | 6/2015 | Stenneth | |
| 2015/0253141 A1 | 9/2015 | Kesting et al. | |
| 2016/0125734 A1 | 5/2016 | Stenneth | |
| 2016/0167582 A1 | 6/2016 | Chen et al. | |
| 2018/0017396 A1 | 1/2018 | Lynch | |
| 2018/0158325 A1 | 6/2018 | Bernhardt et al. | |
| 2018/0202816 A1 | 7/2018 | Kesting et al. | |
| 2018/0357890 A1 | 12/2018 | Fowe et al. | |
| 2019/0311613 A1 | 10/2019 | Johnson et al. | |
| 2020/0202708 A1 | 6/2020 | Fowe | |
| 2021/0142659 A1 | 5/2021 | Chen et al. | |
| 2021/0164797 A1* | 6/2021 | Sun | G01C 21/3602 |

OTHER PUBLICATIONS

Machine Translation of CN106289036A (Year: 2017).*

Rogers et al., "Mining GPS Data to Augment Road Models", KDD '99: Proceedings of the Fifth ACM SIGKDD International Conference on Knowledge Discovery and Data Mining (Aug. 1999), pp. 104-113.

U.S. Appl. No. 17/115,999, filed Dec. 9, 2020; In re: James Adeyemi Fowe, entitled "Method, Apparatus And Computer Program Product For Detecting A Lane Closure Using Probe Data".

U.S. Appl. No. 17/116,469, filed Dec. 9, 2020; In re: James Adeyemi Fowe, entitled "Method, Apparatus And Computer Program Product For Determining Lane Status Confidence Indicators Using Probe Data".

U.S. Appl. No. 17/115,950, filed Dec. 9, 2020; In re: James Adeyemi Fowe, entitled "Method, Apparatus And Computer Program Product For Detecting A Lane Shift Using Probe Data".

U.S. Appl. No. 17/556,269, filed Dec. 20, 2021; In re: James Adeyemi Fowe, entitled "Automatic Detection Of Segment Width Expansion Using Probe Data".

Yang et al., "Automatic Change Detection In Lane-Level Road Networks Using GPS Trajectories", International Journal of Geographical Information Science, vol. 32, No. 12, (Nov. 24, 2017), 22 pages.

Non-Final Office Action for U.S. Appl. No. 17/115,999 dated Dec. 6, 2022.

Notice of Allowance for U.S. Appl. No. 17/116,469 dated Oct. 19, 2022.

Non-Final Office Action for U.S. Appl. No. 17/115,950 dated Dec. 16, 2022.

Extended European Search Report for European Application No. 21213436.5 dated May 4, 2022, 9 pages.

Final Office Action for U.S. Appl. No. 17/115,999 dated Aug. 18, 2023.

Final Office Action for U.S. Appl. No. 17/115,950 dated Jul. 28, 2023.

* cited by examiner

US 11,892,317 B2

AUTOMATIC DETECTION OF SEGMENT WIDTH NARROWING USING PROBE DATA

TECHNOLOGICAL FIELD

An example embodiment relates generally to a method, apparatus and computer program product for road mapping, road segment characterization and analysis, lane-level analysis of road segments, and/or the like using probe data.

BACKGROUND

Traffic-aware routing and navigation systems are commonly dependent upon current and up-to-date knowledge of traffic conditions and road characteristics. With various traffic-related events, infrastructure modifications, and other conditions dynamically changing these factors, routing and navigation systems may undesirably use and rely upon outdated and inaccurate data. Manual observation and reporting of changed traffic conditions and/or road characteristics may be too late to appropriately adjust behavior and output of routing and navigation systems responsively and may be further associated with observation errors. Accordingly, various challenges exist with routing and navigation in view of dynamic factors that may change traffic conditions and road characteristics.

BRIEF SUMMARY

In general, embodiment of the present disclosure provide methods, apparatuses, computer program products, systems, devices, and/or the like for automatic determination and detection of road segment changes, or changes to road segment characteristics. Specifically, in various embodiments, changes in road segment width, including expansion of segment width and narrowing of segment width, may be automatically detected in real-time or near real-time to enable improved navigation in accordance with up-to-date and current road segment information. To estimate changes in the width of a road segment, real-time or near real-time probe data is collected, and width-defining portions of the probe data are compared with corresponding portions of historical probe data. The width-defining portions of the probe data generally represent the lateral limits of the road segment, and the partitioning of the probe data are representative of a lateral distribution of lanes such that the width-defining portions specifically represent the lanes on either lateral extreme of the road segment (e.g., the left-most lane and the right-most lane). Accordingly, various embodiments provide for automatic detection of width changes for a road segment based at least in part on lane-level analysis of the segment for improved accuracy.

According to an aspect of the present disclosure, an apparatus including at least processing circuitry and at least one non-transitory memory including computer program code instructions is provided. In one embodiment, the computer program code instructions are configured to, when executed by the processing circuitry, cause the apparatus to partition subject probe data associated with a segment into a number of clusters with respect to a lateral dimension of the subject probe data. The computer program code instructions are further configured to, when executed by the processing circuitry, cause the apparatus to identify two width-defining clusters within the subject probe data. The computer program code instructions are further configured to, when executed by the processing circuitry, cause the apparatus to determine a width narrowing measure for the segment based at least in part on comparing statistical measures for the two width-defining clusters within the subject probe data to statistical measures for corresponding clusters within historical probe data associated with the segment. The computer program code instructions are further configured to, when executed by the processing circuitry, cause the apparatus to provide an indication of whether a width of the segment has been narrowed according to the width narrowing measure.

In various embodiments, the two width-defining clusters include a first cluster associated with a maximum average lateral position and a second cluster associated with a minimum average lateral position. In various embodiments, the historical probe data is partitioned into a second number of clusters with respect to a lateral dimension of the subject probe data. In various embodiments, the second number of clusters is the same as the number of clusters into which the subject probe data is partitioned. In various embodiments, the corresponding clusters within the historical probe data are width-defining clusters for the historical probe data associated with a minimum average lateral position within the historical probe data and a maximum average lateral position within the historical probe data.

In various embodiments, the indication that the width of the segment has been narrowed is provided based at least in part on the width narrowing measure satisfying a configurable threshold. In various embodiments, the computer program code instructions are further configured to, when executed by the processing circuitry, cause the apparatus to partition second probe data associated with a second segment adjacent to the segment into the same number of clusters, and determine whether the second segment has a narrower width than the segment based at least in part on a second width narrowing measure determined for the second segment. In various embodiments, the width narrowing measure is determined in real-time or near real-time relative to receipt of the subject probe data. In various embodiments, the historical probe data is collected within a historical time period while the subject probe data is collected within a subject time period. The historical time period and the subject time period may span the same amount of time. In various embodiments, the subject probe data is clustered using a k-means algorithm.

According to another aspect of the present disclosure, a computer program product including at least one non-transitory computer-readable storage medium having computer-executable program code instructions stored therein is provided. In one embodiment, the computer-executable program code instructions include program code instructions to partition subject probe data associated with a segment into a number of clusters with respect to a lateral dimension of the subject probe data. The computer-executable program code instructions further include program code instructions to identify two width-defining clusters within the subject probe data. The computer-executable program code instructions further include program code instructions to determine a width narrowing measure for the segment based at least in part on comparing statistical measures for the two width-defining clusters within the subject probe data to statistical measures for corresponding clusters within historical probe data associated with the segment. The computer-executable program code instructions further include program code instructions to provide an indication of whether a width of the segment has been narrowed according to the width narrowing measure.

In various embodiments, the two width-defining clusters include a first cluster associated with a maximum average lateral position and a second cluster associated with a minimum average lateral position. In various embodiments, the historical probe data is partitioned into a second number of clusters with respect to a lateral dimension of the subject probe data. In various embodiments, the second number of clusters is the same as the number of clusters into which the subject probe data is partitioned. In various embodiments, the corresponding clusters within the historical probe data are width-defining clusters for the historical probe data associated with a minimum average lateral position within the historical probe data and a maximum average lateral position within the historical probe data.

In various embodiments, the indication that the width of the segment has been narrowed is provided based at least in part on the width narrowing measure satisfying a configurable threshold. In various embodiments, the computer-executable program code instructions further include program code instructions to partition second probe data associated with a second segment adjacent to the segment into the same number of clusters, and determine whether the second segment has a narrower width than the segment based at least in part on a second width narrowing measure determined for the second segment. In various embodiments, the width narrowing measure is determined in real-time or near real-time relative to receipt of the subject probe data. In various embodiments, the historical probe data is collected within a historical time period while the subject probe data is collected within a subject time period. The historical time period and the subject time period may span the same amount of time. In various embodiments, the subject probe data is clustered using a k-means algorithm.

According to yet another aspect of the present disclosure, a method is provided, the method including partitioning subject probe data associated with a segment into a number of clusters with respect to a lateral dimension of the subject probe data. The method further includes identifying two width-defining clusters within the subject probe data. The method further includes determining a width narrowing measure for the segment based at least in part on comparing statistical measures for the two width-defining clusters within the subject probe data to statistical measures for corresponding clusters within historical probe data associated with the segment. The method further includes providing an indication of whether a width of the segment has been narrowed according to the width narrowing measure.

In various embodiments, the two width-defining clusters include a first cluster associated with a maximum average lateral position and a second cluster associated with a minimum average lateral position. In various embodiments, the historical probe data is partitioned into a second number of clusters with respect to a lateral dimension of the subject probe data. In various embodiments, the second number of clusters is the same as the number of clusters into which the subject probe data is partitioned. In various embodiments, the corresponding clusters within the historical probe data are width-defining clusters for the historical probe data associated with a minimum average lateral position within the historical probe data and a maximum average lateral position within the historical probe data.

In various embodiments, the indication that the width of the segment has been narrowed is provided based at least in part on the width narrowing measure satisfying a configurable threshold. In various embodiments, the method further includes partitioning second probe data associated with a second segment adjacent to the segment into the same number of clusters, and determining whether the second segment has a narrower width than the segment based at least in part on a second width narrowing measure determined for the second segment. In various embodiments, the width narrowing measure is determined in real-time or near real-time relative to receipt of the subject probe data. In various embodiments, the historical probe data is collected within a historical time period while the subject probe data is collected within a subject time period. The historical time period and the subject time period may span the same amount of time. In various embodiments, the subject probe data is clustered using a k-means algorithm.

BRIEF DESCRIPTION OF THE DRAWINGS

Figure 1:
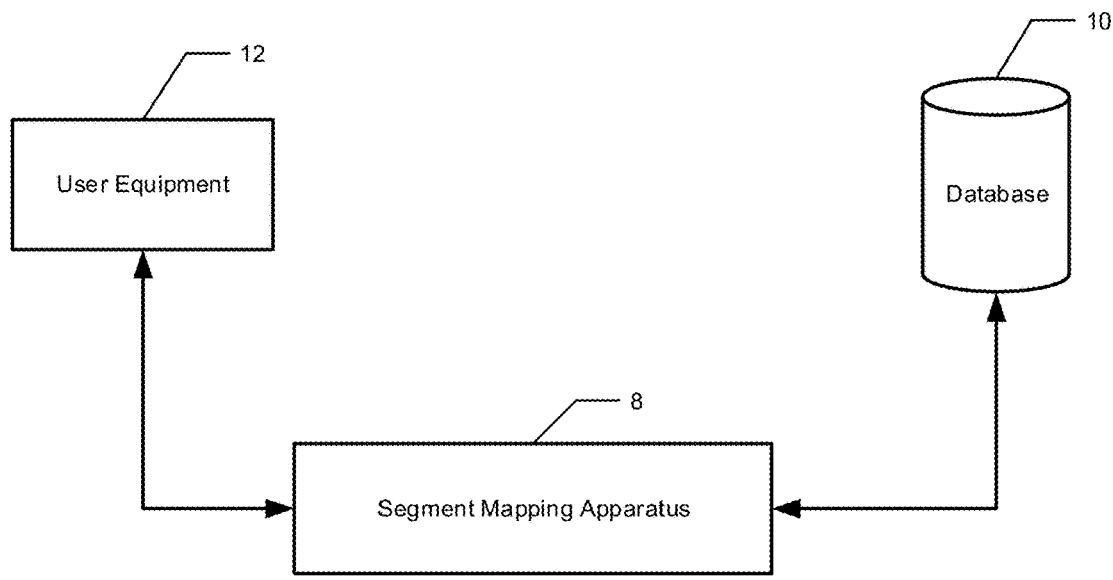
Figure 2:
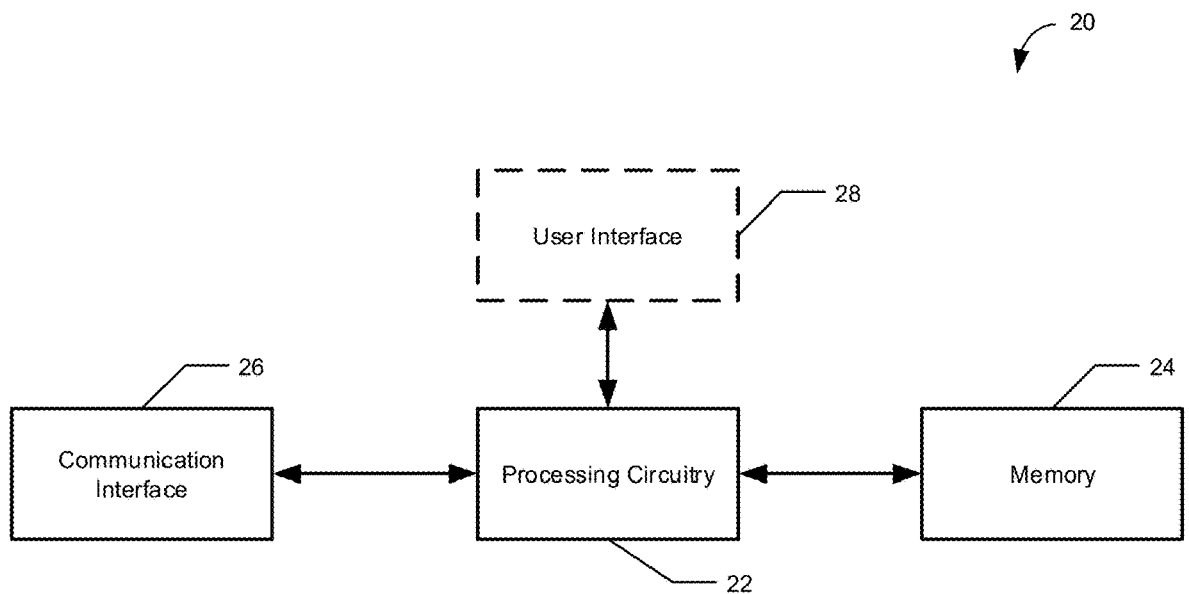
Figure 3:
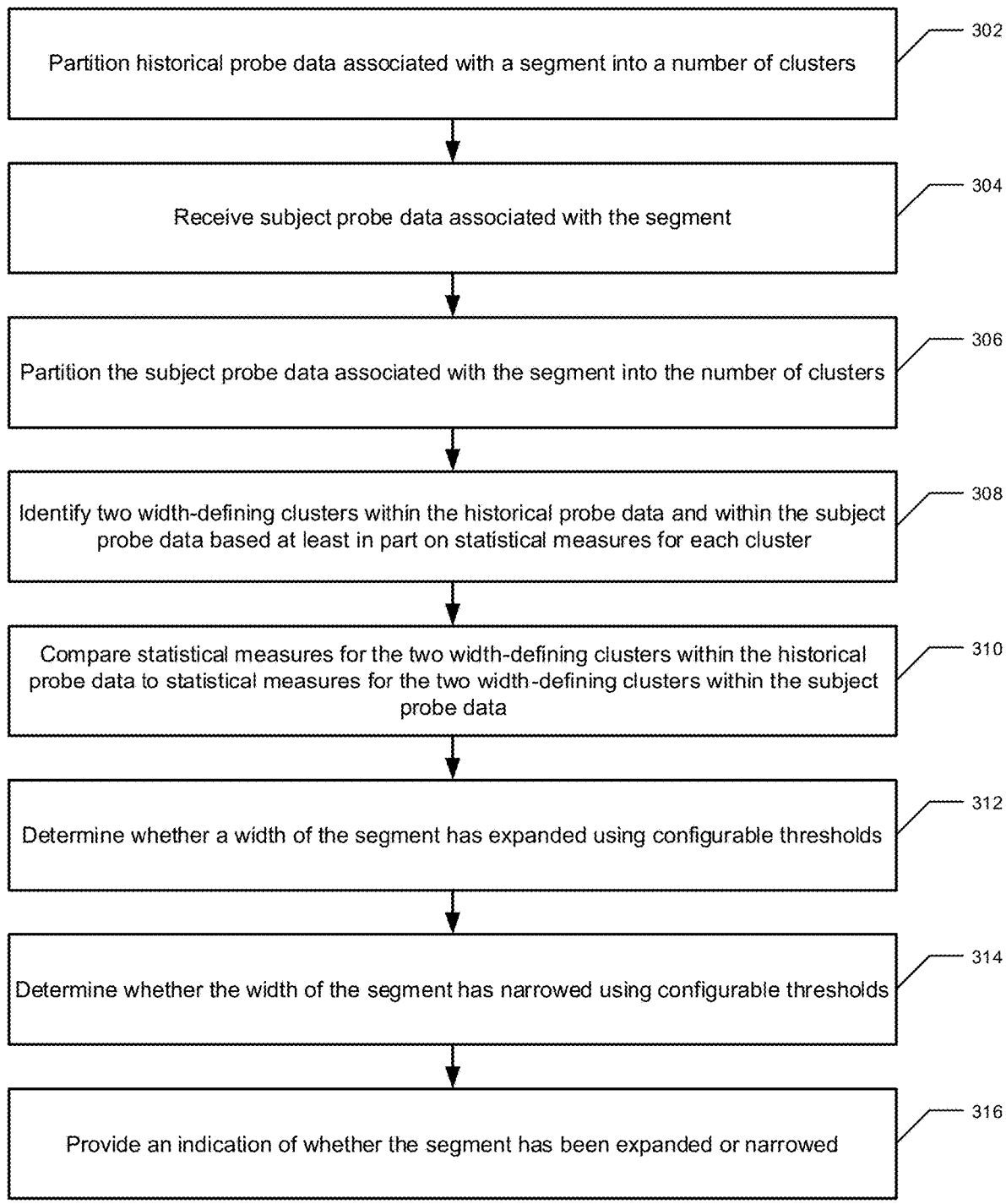
Figure 4:
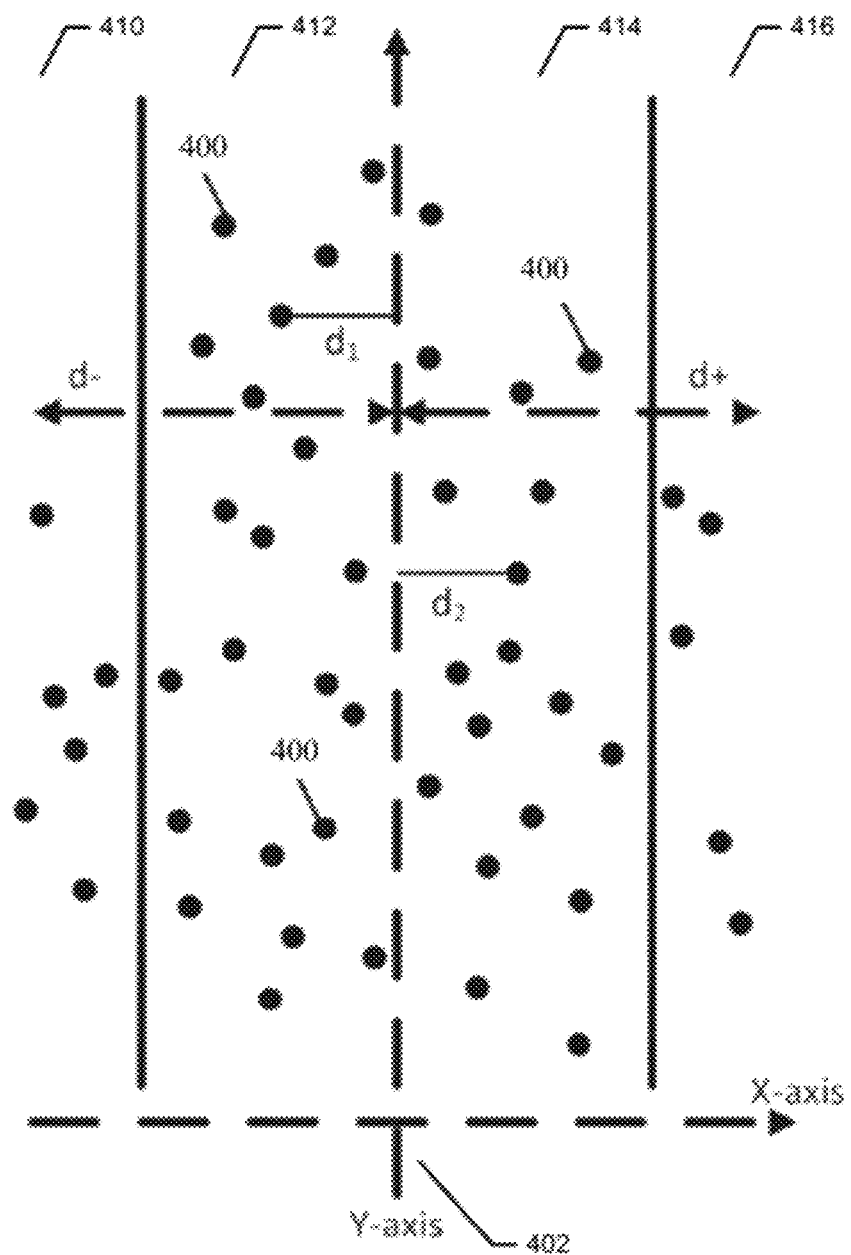
Figure 5A:
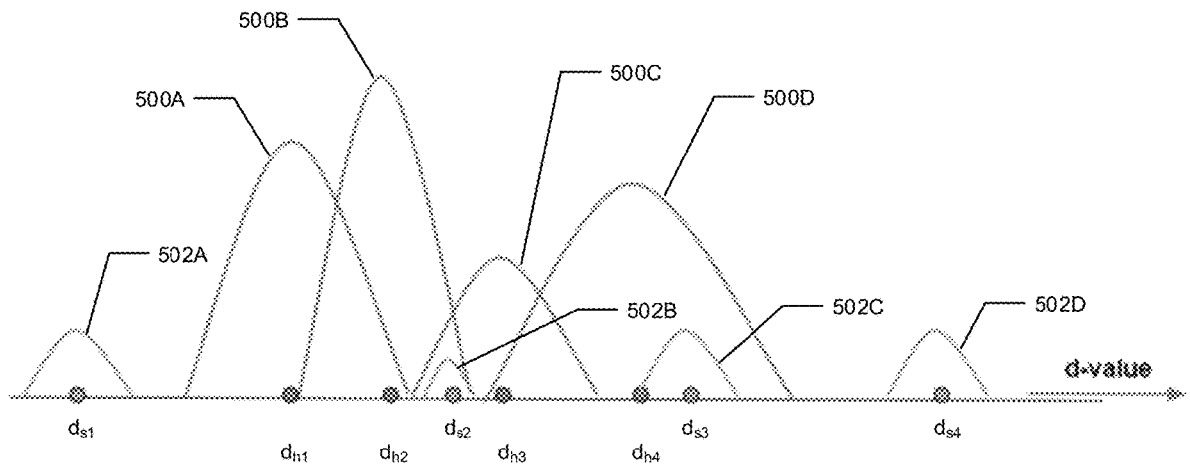
Figure 5B:
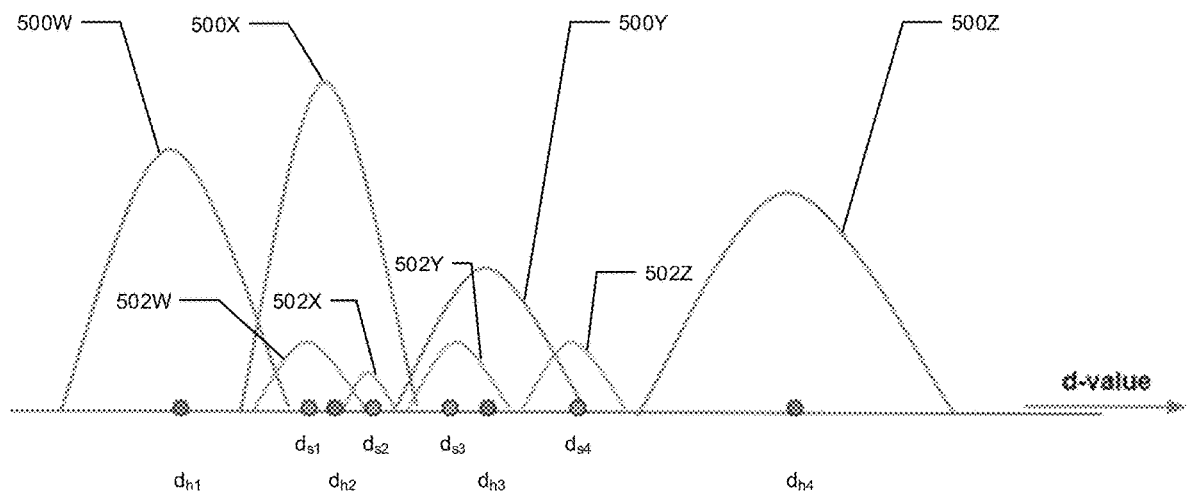

Having thus described certain embodiments of the invention in general terms, reference will now be made to the accompanying drawings, which are not necessarily drawn to scale, and wherein:

FIG. 1 provides a system diagram depicting an example segment mapping apparatus in data communication with example user equipment and an example database, in accordance with an example embodiment of the present disclosure;

FIG. 2 provides a block diagram illustrating an example apparatus that may be configured to automatically detect changes in road segment width using probe data, in accordance with an example embodiment of the present disclosure;

FIG. 3 provides a flowchart illustrating example operations performed to automatically detect width changes in a road segment using probe data, in accordance with an example embodiment of the present disclosure;

FIG. 4 is a schematic of a distribution of example probe data and partitioning thereof, in accordance with an example embodiment of the present disclosure; and FIGS. 5A and 5B illustrate example lateral distributions of probe data from which width expansion and width narrowing of a road segment can be automatically detected, in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Accurate and reliable navigation is generally dependent upon traffic conditions and an up-to-date knowledge of road segment characteristics. In particular, road segment characteristics on both a lane-level and a segment-level may be significantly dynamic, with lanes being closed or shifted in some example instances. Broadly, holistic characteristics of a road segment may change over time, whether as a result of lane-level events or independently thereof. Various embodiments of the present disclosure are particularly directed to changes of road segment widths and the automatic detection thereof. As used throughout the present disclosure, the width of a road segment may generally refer to a total lateral span of the road segment that is accessible, navigable, traversable, and/or the like by vehicles. In various contexts, for example, the width of a road segment may refer to a direction-specific width, or the total lateral span that is available vehicles traveling in a particular direction along the road segment (e.g., a direction-specific width may be a subset of a total width of a two-direction road). In other example contexts, the width of a road segment may refer to a direction-agnostic direction without consideration to traffic direction of the road segment. It will be understood that various embodiments discussed herein provide automatic detection of uni-directional widths and bidirectional widths interchangeably and as appropriate in respective contexts.

Generally, various embodiments provide automatic detection of width changes of road segments using probe data and in real-time (or near real-time). Use of probe data enables prompt and rapid determination of segment width changes (e.g., width expansion, width narrowing) to further enable accurate navigation along road segments. Probe data is relatively inexpensive and widely available, and use thereof in various embodiments to detect segment width changes provides technical advantages accordingly. Specifically, detection of segment width expansion and narrowing using probe data as provided by various embodiments described herein is scalable to multiple road segments, and as a result, significant lengths of road can be monitored for width changes in an efficient manner. Further, processing and memory resources that would otherwise be dedicated and/or expended to operate expensive light detection and ranging (LIDAR) systems, other remote sensing systems, and/or computer vision systems, in some examples, may be conserved as segment width changes are detected through probe data as an alternative, in accordance with various embodiments of the present disclosure.

Referring to FIG. 1, an exemplary system in which certain example embodiments operate is depicted. The exemplary system may be configured for at least automatic detection of width expansion and width narrowing of road segments, and in some example embodiments, the exemplary system is configured for further actions responsive to positive detections thereof, including adjustment of navigational routes, alerting drivers, updating of map data, and/or the like. The illustrated embodiment of FIG. 1 includes a segment mapping apparatus 8 in data communication with user equipment (UE) 12 and a database 10. The components of FIG. 1 may communicate over a network that may be wired, wireless, or any combination of wired and wireless communication networks, such as cellular, Wi-Fi, internet, local area networks, or the like. In general, probe data, such as vehicle probe data, collected from probe devices is collected and stored in database 10. In this regard, any of a variety of devices may serve as a probe device, such as a mobile device, (e.g., a smartphone, a tablet computer, a personal digital assistant (PDA), a personal navigation device (PND), and/or the like), an in-vehicle navigation system, a vehicle control system, an advanced driver-assistance system (ADAS) and/or the like, that provides samples of probe data regarding, for example, the location of a vehicle as the vehicle proceeds along a road. The probe data may include not only the location of the vehicle as may be defined by a global positioning system (GPS) associated with the probe, and the time (e.g., timestamp, time of day, and/or time of week) at which the vehicle is at the location, but also the speed, the heading and other parameters that define the current behavior of the vehicle. In various embodiments, a location of the vehicle at a given time as described by the probe data may be two-dimensional (e.g., a latitude coordinate and a longitude coordinate), three-dimensional (e.g., latitude and longitude coordinates in combination with elevation measures), and/or the like.

In certain embodiments, the database 10 may be populated and maintained by a separate service accessible by segment mapping apparatus 8 and may further include a map database and/or map data. While database 10 is illustrated as a single database in FIG. 1, it will be appreciated that in certain embodiments, a map database may be implemented separately from a database storing the probe data, and the probe data may include any location-based data that enables association with a road segment, or segment, defined by a map database, such as via a map matching technique described in further detail below.

The map data, such as the map data stored on database 10, may be maintained by a content provider such as a map developer. By way of example, the map developer can collect geographic data to generate and enhance the database 10. There can be different methods used by the map developer to collect data. These methods can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning.

The database 10 may include a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 12, for example. Further, data may be compiled defining segments of the map database.

The compilation to produce the end user database(s) can be performed by a party or entity separate from the segment mapping apparatus 8. For example, a navigation device developer or other end user device developer, can perform compilation on a received map database and/or probe database in a delivery format to produce one or more compiled databases. For example, as discussed herein, probe data may be map matched to segments defined in the map database. In example embodiments, segment mapping apparatus 8 may therefore access and utilize historical probe data that is map matched to a segment. However, in certain embodiments, segment mapping apparatus 8 may perform a map matching technique to match probe data to a segment and utilize the matched data as described in further detail herein.

As mentioned above, the database 10 may include a master geographic database, but in certain embodiments, the database 10 may represent a compiled navigation database that may be used in or with end user devices (e.g., user equipment 12) to provide navigation and/or map-related functions. For example, the database 10 may be used with the user equipment 12 to provide an end user with navigation features. In such a case, the database 10 can be downloaded or stored on the end user device (user equipment 12) which can access the database 10 through a wireless or wired connection, such as via the segment mapping apparatus 8, for example.

In an example embodiment, the map data may include node data, road segment data or link data, point of interest (POI) data or the like. The database may also include cartographic data, routing data, and/or maneuvering data. According to some example embodiments, the road segment data records may be segments or segments representing roads, streets, or paths, as may be used in calculating a route or recorded route information for determination of one or more personalized routes. The map data may include various attributes of road segments and/or may be representative of sidewalks or other types of pedestrian segments, as well as open areas, such as grassy regions or plazas. The node data may be end points corresponding to the respective links and/or segments. The segment data and the node data may represent a road network, such as used by vehicles, cars, trucks, buses, motorcycles, and/or other entities. Optionally, the database may contain path segments and node data records or other data that may represent bicycle lanes, pedestrian paths or areas in addition to or instead of the vehicle road record data, for example.

The segment and nodes can be associated with attributes, such as geographic coordinates, street names, address ranges, speed limits, turn restrictions at intersections, direction of travel, and/or other navigation-related attributes, as well as POIs, such as fueling stations, hotels, restaurants, museums, stadiums, offices, auto repair shops, buildings, stores, parks, and/or the like. The database can include data about the POIs and their respective locations in the POI records. The database may include data about places, such as cities, towns, or other communities, and other geographic features such as bodies of water, mountain ranges, and/or the like. Such place or feature data can be part of the POI data or can be associated with POIs or POI data records (such as a data point used for displaying or representing a position of a city).

In addition, the map database can include event data (e.g., traffic incidents, construction activities, scheduled events, unscheduled events, etc.) associated with the POI data records or other records of the map database. The map database may further indicate a plurality of contiguous segments as a strand. It will be appreciated that some references made herein to a single segment may refer to a strand comprising multiple segments. Accordingly, resultant data may be generated that is associated with a strand, or a plurality of contiguous segments.

According to example embodiments, the map data is utilized in a manner that enables probe data to be associated with a segment, whether through map matching as described, manual input and entry, or otherwise. In addition to, or alternatively to the probe data including location data, such as GPS location, the probe data may also include an identifier, such as a trajectory identifier, that identifies the probe that provides the probe data and enables the linking of instances of probe data into vehicle trajectories and probe traces while still, in some embodiments, maintaining the anonymity of the probe device and/or a vehicle that the probe device is onboard. Thus, probe traces define the path of a probe device, such as may be carried by a vehicle during its travel along a portion of the road network. In various embodiments, probe traces, or sequences of related probes, can be used to infer traffic directions of road segments and portions (e.g., lanes thereof), which may further enable determination and analysis of lane-level activity and the detection of direction-specific width changes.

Example embodiments described herein involve collection of subject probe data associated with a segment and comparison of positional information of the subject probe data to that of historical probe data for the same segment. Comparison of subject probe data and historical probe data for a given segment enables real-time or near real-time mapping of the given segment, which includes detection of changes in segment width. Specifically, partitioned portions or clusters of probe data is compared in various embodiments for the determination of segment width changes, as well as for the determination of lane-level statuses and events within the road segment. In this regard, further detail regarding determination of lane-level statuses is provided in U.S. patent application Ser. No. 17/115,999 (titled METHOD, APPARATUS AND COMPUTER PROGRAM PRODUCT FOR DETECTING A LANE CLOSURE USING PROBE DATA and filed Dec. 9, 2020) and in U.S. patent application Ser. No. 17/115,950 titled METHOD, APPARATUS AND COMPTUER PROGRAM PRODUCT FOR DETECTING A LANE SHIFT USING PROBE DATA and filed Dec. 9, 2020), the contents of each being hereby incorporated by reference in their entireties.

In various embodiments, subject and historical probe data may be compared in real-time or near real-time such that alerts regarding segment width changes (e.g., expansion of segment width, narrowing of segment width) may be provided to drivers traveling in or approaching the affected segment. The alerts may be provided to any user equipment 12, which may embody a navigation system, an advanced driver assistance system (ADAS), an in-vehicle infotainment system, a mobile device (such as one configured to access a mapping or navigation application or website), a dynamic road sign, a personal navigation device (PND), a portable navigation device, a cellular telephone, a smart phone, a personal digital assistant (PDA), a watch, a camera, a computer, and/or the like. In certain embodiments, the user equipment 12 may include a mobile device associated, coupled, or otherwise integrated with a vehicle, such as in a vehicle's head unit, infotainment unit, navigation system, or an ADAS, for example. In certain embodiments, the user equipment 12 configured to provide alerts and navigational-related information may embody a probe device that transmits probe data over the network for processing as described herein.

Further indications that a segment width has expanded or narrowed may be provided to other entities for other functions, in some examples. For instance, such indications may be provided or communicated to the database 10 such that map data stored by the database 10 can be updated to reflect the changed width of the road segment. As discussed, the map data may include data describing the characteristics of road segments, with width being one of such characteristics, and the real-time or near real-time determination of segment width changes enable the map data to reflect relatively current and up-to-date information regarding various road segments.

As used herein, the terms real-time and near real-time indicate a seemingly instant accounting of probe data associated with a segment for a given time period leading up to a present or current time. Additionally or alternatively, a response to a request described herein may be provided in real-time or near real-time at the user equipment 12 such that the response time is seemingly instant relative to when the request was made or initiated. For example, a vehicle approaching a segment, may trigger a request for width information for the segment, and example embodiments may utilize real-time or near real-time subject probe data of other vehicles traveling on the segment (in a period of time leading up to a current time) to assess a current (e.g., real-time or near real-time) lateral distribution of lanes for determination of segment width, and provide a response in real-time or near real-time to user equipment 12. It will be appreciated that despite references to current, real-time, or near real-time, certain delays based on computer processing time may be encountered. Performing certain operations described herein in real-time or near real-time may enable accurate segment width detection and alerts thereof to be provided in a timely manner to drivers and/or vehicles, such as those approaching a segment with an expanded or narrowed width.

As shown in FIG. 2, an apparatus 20 is provided in accordance with an example embodiment, for implementing the segment mapping apparatus 8 and/or user equipment 12. The apparatus of certain embodiments, such as the segment mapping apparatus 8, may be embodied by any of a wide variety of different computing devices including, for example, a server, a computer workstation, a personal computer, a desktop computer or any of a wide variety of computing devices. In certain embodiments, the user equipment 12 may be embodied by a wide variety of computing devices including, but not limited to, mobile devices, in-vehicle navigation systems, other navigation systems, in-vehicle infotainment systems, dynamic road signs, personal computers, and/or the like. Regardless of the type of computing device that embodies the apparatus 20, the apparatus of an example embodiment includes, is associated with or is in communication with processing circuitry 22, memory 24 and communication interface 26. A user interface 28 is included in apparatus 20 when the apparatus is embodied by user equipment 12, but may be optional when apparatus 20 is embodied by a segment mapping apparatus 8.

In some embodiments, the processing circuitry 22 (and/or co-processors or any other processors assisting or otherwise associated with the processing circuitry) may be in communication with the memory device 24 via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processing circuitry.

The processing circuitry 22 may be embodied in a variety of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processor may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 22 may be configured to execute instructions stored in the memory device 24 or otherwise accessible to the processing circuitry. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment of the present invention while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be a processor of a specific device (for example, a computing device) configured to employ an embodiment of the present invention by further configuration of the processor by instructions for performing the algorithms and/or operations described herein. The processing circuitry may include, among other things, a clock, an arithmetic logic unit (ALU) and logic gates configured to support operation of the processing circuitry.

The apparatus 20 of an example embodiment may also optionally include a communication interface 26 that may be any means such as a device or circuitry embodied in either hardware or a combination of hardware and software that is configured to receive and/or transmit data from/to other electronic devices in communication with the apparatus, such as any of the components of FIG. 1. Additionally or alternatively, the communication interface may be configured to communicate in accordance with various wireless protocols including Global System for Mobile Communications (GSM), such as but not limited to Long Term Evolution (LTE) and/or new radio (e.g., 5G). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In this regard, the communications interface 26 may facilitate the collection of, and/or access to, probe data, and access to map data.

The apparatus 20 of an example embodiment, such as user equipment 12, may also optionally include a user interface 28 that provides an audible, visual, mechanical, or other output to the user. As such, the user interface 28 may include, for example, a keyboard, a mouse, a display, a touch screen display, a microphone, a speaker, and/or other input/output mechanisms. As such, in embodiments in which apparatus 20 is implemented as user equipment 12, the user interface 28 may, in some example embodiments, provide means for provision of alerts relating to lane statuses, such as but not limited to closure and/or shifting of a lane. In some example embodiments, aspects of user interface 28 may be limited or the user interface 28 may not be present.

FIG. 3 is a flowchart illustrating example operations of an apparatus 20, according to example embodiments. The operations of FIG. 3 may be performed by apparatus 20, with the segment mapping apparatus 8, embodied by the segment mapping apparatus 8, and/or the like. However, according to certain embodiments, another service or device accessible by the segment mapping apparatus 8 may perform certain operations of FIG. 3, such that certain operations of FIG. 3 may be performed in a distributed system.

As shown in operation 302, apparatus 20 includes means, such as processing circuitry 22, memory 24, communication interface 26, and/or the like, for partitioning historical probe data associated with a segment into a number of clusters. The apparatus 20 may access the historical probe data on database 10, over communication interface 26. In various embodiments, the historical probe data is partitioned with respect to lateral positional indicators of the historical probe data. In some examples, historical probe data associated with multiple segments can be partitioned in operation 302, albeit on a segment basis.

An example of partitioning probe data by lateral positional indicators is illustrated in FIG. 4. A plurality of probe data, or "probes" 400 of a segment are plotted by their deviation or d-value (e.g., $d_1$ and $d_2$ in FIG. 4) as the lateral distance, or x-distance between the probe position and a center line vector 402. As illustrated in FIG. 4, the center line vector 402 may be a y-axis vector positioned in the center of a segment, such as by determining a lateral midway point of a spread of the probe data, mean, or median lateral positional indicator of the probe data, and/or the like. A center line vector 402 may additionally or alternatively be identified based on map data and/or any other means. For instance, the center line vector 402 may be defined at a midpoint of a determined width of the map data, and as width changes are detected for a given road segment, the center line vector 402 for the given road segment may be updated accordingly for future instances of partitioning probe data for the given road segment. As another example, the center line vector 402 may be determined to be a y-axis vector positioned in the center of an even number of lanes of a segment, or a y-axis vector positioned in the center of a center lane of an odd number of lanes (not shown), and running parallel to the flow of traffic, as indicated by the map matching algorithm and/or trajectories of probe data.

The center line vector 402 is provided herein as an exemplary basis by which to determine a lateral positional indicator, but it will be appreciated that various modifications may be contemplated. For a plurality of probes 400, indicated in FIG. 4 according to the position or location data associated therewith, a center line vector 402 may be generated that represents an estimated center line of a segment.

In some example embodiments, d-values to the left of the center line vector 402 have negative values, and d-values to the right of the center line vector 402 have positive values. Therefore, the sign or polarity of a positional indicator (e.g., d-value) may indicate direction of the probe 400 from the center line vector 402, and the absolute value of the d-value indicates how far the probe 400 is from the center line vector 402, measured laterally, or at a direction orthogonal to the flow of traffic (and/or center line vector 402). A d-value may therefore be considered a lateral positional indicator of a probe 400, in various example embodiments. In any regard, the d-values may then be used to partition probe data comprising a plurality of probes 400, such as by using any suitable clustering algorithm such as k-means. That is, probe data may be partitioned with respect to the lateral positional indicators of its probes 400.

With regard to performing the k-means algorithm, it will be appreciated that example embodiments, such as processing circuitry 22, may utilize any number of clusters k. That is, a number k of clusters may be defined to control the how probe data is partitioned. As shown in FIG. 4, the k-means algorithm may be performed with k=4 to partition the probe data into four clusters 410, 412, 414 and 416. As demonstrated, a cluster of probe data includes a subset of probes 400 of the probe data. The value of k need not necessarily be the number of lanes of the segment, but rather may be a value determined as producing accurate results, such as in comparison to utilizing a different k-value producing less accurate results. To assess accuracy of different k-values, a data analyst may study the results of certain samples, according to example embodiments provided herein, and configure or program a k-value. As another example, different k-values may be determined for different segments, or segments having specific characteristics as indicated by the map data. One k-value may be determined for segments having one or more predefined ratings and/or classifications, while a different k-value may be determined for segments having one or more different predefined ratings and/or classifications according to the map data.

In various embodiments, partitioning probe data, including historical probe data, into a number of clusters comprises determining statistical measures for each cluster. For example, a mean d-value and/or standard deviation of d-values may be computed for each cluster, or specifically across the subset of probes 400 for each cluster. A statistical measure of the lateral positional indicator, such as a mean d-value, for a cluster may then represent the positioning of that cluster either on the left or right or center of the center line vector 402, and to what extent. The sign or polarity of the statistical measure (e.g., mean d-value) of the lateral positional indicators for a cluster indicate direction of the cluster from the center line vector 402, and the absolute value of the statistical measure (e.g., mean d-value) provides a lateral indicator of distance of the cluster from the center line vector 402 (measured at a direction orthogonally to, or substantially orthogonally to, the flow of traffic).

Although the statistical measure of a lateral positional indicator of a cluster may be frequently referenced herein as the mean d-value and/or standard deviation of the d-value of the cluster, it will be appreciated that other statistical measures, such as median, may be used. While reference to a center line vector 402 and d-values defined as a lateral offset from the center line vector 402 are made herein, it will be appreciated that other methods for determining a baseline vector and/or corresponding lateral positional indicators of probes may be contemplated.

The clustering and determination of statistical lateral positional indicators may be determined using a variety of historical probe data. For example, in certain embodiments, all historical probe data available for a segment may be utilized to determine clusters and statistical measures of the historical positional indicators for the segment. As another example, a subset of probe data, such as data spanning a 1-month period may be used. In any event, the clustering and determination of statistical lateral positional indicators of historical probe data estimate a baseline for the lateral distribution of traffic over a segment. Accordingly, operation 302 may occur separately from and at an earlier timepoint than the other operations of FIG. 3. In this regard, the historical probe data may be processed, and associated lateral positional indicators may be stored on database 10, for access by segment mapping apparatus 10 and to be processed by example embodiments as described below.

In operation 304, apparatus 20 may include means, such as processing circuitry 22, memory 24, communication interface 26, and/or the like, for receiving subject probe data associated with the segment. The segment for which subject probe data is to be obtained may be indicated in a systematic manner, such that the process described below may be performed for a variety of segments on a routine basis and transmitted to user equipment 12 such as user equipment in the vicinity of, or approaching the segment. As another example, a vehicle and/or associated user or in-vehicle navigation system may be registered with a service to receive segment width updates, such that as the vehicle approaches a segment, a request is initiated, and example embodiments provide for automatically detecting width changes of the segment in response thereto, as described herein.

In any event, the subject probe data for the segment may be considered a set of real-time, near real-time, or current probe data such as probe data spanning a time period leading up to a current time. For example, the subject probe data may include most recent probe data spanning the past hour, past day, and/or any other time period leading up to a certain time, such as a current or real time. When the subject probe data is received and processed systematically, the subject probe data analyzed may cover the time period since a most recent processing. For example, the subject probe data may span a 24-hour period and may be retrieved daily for processing. As another example, the subject probe data may span a 30-minute period and may be processed every 30 minutes.

In various embodiments, receiving the subject probe data may prompt or trigger access of the historical probe data associated with the same segment. In this regard, a set of historical probe data processed, partitioned (e.g., in accordance with operation 302), and pertaining to the same segment as the subject probe data may be accessed, such as on database 10. In certain embodiments, apparatus 20 may utilize all historical probe data available for a segment. In certain embodiments, apparatus 20 may select or retrieve only a subset of the historical probe data available, and in certain embodiments the subset of the historical probe data selected may be dependent on the subject probe data, and/or time relative to the week, or day of the week with which the subject probe data is associated. For example, if the subject probe data received with respect to operation 304 relates to a 4-hour window on a Saturday, example embodiments may access historical probe data associated with the same 4-hour window on prior Saturdays, on a given week or weeks prior to a time the subject probe data is received and/or processed. As another example, if the subject probe data is associated with a Friday, example embodiment may retrieve historical probe data associated with Fridays (optionally covering any extended time period). Any variation may be contemplated based on identified predictors of traffic. For example, certain timeframes on weekdays may be associated together as having similar traffic patterns.

In operation 306, apparatus 20 includes means, such as processing circuitry 22, memory 24, and/or the like, for partitioning the subject probe data into the number of clusters, with the number of clusters for partitioning the subject probe data being the same as the number of clusters for partitioning the historical probe data associated with the segment, in some examples. In this regard, a similar or same algorithm such as used in operation 302 may be applied to the subject probe data (e.g., real-time, near real-time, or current probe data). For example, the k-means algorithm using the same k-value as used in operation 302 for processing historical probe data associated with the same segment may be used. Thus, the historical probe data and the subject probe data for the segment may be consistently and similarly partitioned, in example embodiments.

In various embodiments, statistical measures for each cluster of the subject probe data may be determined. Similar to the statistical measures determined for the clusters of the historical probe data, the statistical measures determined here for clusters of subject probe data may be with respect to the lateral positional indicators of each cluster, or the individual probes 400 of each cluster of the subject probe data. In particular, in some example embodiments, a mean or average lateral position is determined for each cluster, and in some further embodiments, other statistical measures including a lateral standard deviation may additionally be determined. With the determination of statistical measures for each cluster, a cluster of probe data generally (e.g., subject probe data, historical probe data) can be defined and/or characterized by its statistical measures. For instance, a particular cluster can be defined, characterized, identified, and/or the like by its average lateral position (e.g., an average d-value across the subset of probes 400 belonging to the particular cluster).

In operation 308, apparatus 20 includes means, such as processing circuitry 22, memory 24, and/or the like, for identifying two width-defining clusters within the historical probe data and within the subject probe data based at least in part on the statistical measures for each cluster in the historical probe data and in the subject probe data. Generally, the width-defining clusters may be representative of the width-defining lanes of the segment, in various examples. For example, the width of the segment may be defined and/or bounded by a left-most lane and a right-most lane, given that the segment has more than one lane. Accordingly, the two width-defining clusters of probe data are identified as the clusters defined with lateral extremes, such as a cluster defined by the left-most or minimum average lateral position and a cluster defined by the right-most or maximum average lateral position. Referring back to FIG. 4, in the illustrated embodiment, cluster 410 may be identified as a width-defining cluster due to cluster 410 having the minimum average lateral position (e.g., d-values of probes 400) of all the clusters, while cluster 416 may also be identified as a width-defining cluster due to cluster 416 having the maximum average lateral position. By identifying width-defining clusters, specific statistical measures corresponding to laterally extreme probes 400 can be identified.

In operation 310, apparatus 20 includes means, such as processing circuitry 22, memory 24, and/or the like, for comparing a statistical measure of the width-defining clusters of the subject probe data to respective statistical measures of the width-defining clusters of the historical probe data. In this regard, example embodiments, such as processing circuitry 22 of apparatus 20 may calculate, for each cluster, a same statistical measure as was calculated for the historical probe data. For example, processing circuitry 22 may calculate the statistical measure of the subject lateral positional indicators as the mean d-value for each cluster of the subject probe data, similarly as described with respect to operation 302. It will be appreciated that the d-values of the subject lateral positional indicators should be calculated based on the same center line vector 402 used as the basis for calculating d-values of the historical probe data.

According to the comparison, a width change of the segment can be automatically detected, and specifically, it may be determined whether the segment width has expanded or narrowed. In operations 312 and 314, apparatus 20 includes means, such as processing circuitry 22, memory 24, and/or the like for determining whether a width of the segment has expanded or narrowed, respectively using configurable thresholds. It may be appreciated that detection of width expansion and detection of width narrowing can be performed at the same time and in parallel, or sequentially in any order. The determination of segment width changes at operations 312 and 314 is based at least in part on the comparison of statistical measures of width-defining clusters in operation 310. FIGS. 5A and 5B illustrate examples of comparisons of statistical measures of the subject width-defining clusters to respective statistical measures of the historical width-defining clusters in order to automatically detect segment width changes.

Referring first to FIG. 5A, historical clusters 500 (e.g., four historical clusters 500A-D) and subject clusters 502 (e.g., four subject clusters 502A-D) are provided on a horizontal axis plotting the frequency of probes 400 by their d-values, or lateral positional indicators. That is, each peak represents a cluster of data, and a cluster may be a historical cluster 500 or a subject cluster 502. As described, a cluster may be defined or characterized by statistical measures of the lateral positional indicators of its probes 400, and FIG. 5A indicates mean d-values as $d_{s1}$, $d_{s2}$, $d_{s3}$, and $d_{s4}$ for the subject probe data, and $d_{h1}$, $d_{h2}$, $d_{h3}$, and $d_{h4}$ for the historical probe data.

In this regard, the statistical measures (e.g., mean) of the historical lateral positional indicators may be sorted, indexed, and/or the like, and the statistical measures (e.g., mean) of the subject lateral positional indicators may be similarly sorted or indexed such that corresponding clusters in historical probe data and subject probe data can be compared.

As discussed, segment width changes are determined through comparison of width-defining clusters in historical probe data and subject probe data, and in FIG. 5A, historical clusters 500A and 500D may be identified as historical width-defining clusters. As shown, historical cluster 500A is associated with an average lateral position $d_{h1}$ that is the minimum (with respect to d-value) across the four average lateral positions $\{d_{h1}, d_{h2}, d_{h3}, d_{h4}\}$ in the historical probe data. Meanwhile, historical cluster 500D is associated with an average lateral position that is the maximum across the four average lateral positions $\{d_{h1}, d_{h2}, d_{h3}, d_{h4}\}$ in the historical probe data. In a similar fashion, subject clusters 502A and 502D are identified as the two width-defining clusters in the subject probe data due to their relative extremes (e.g., minimum and maximum, respectively) in average lateral position, in the illustrated embodiment.

With the width-defining clusters in each of the historical probe data and the subject probe data being identified, statistical measures can then be compared in order to determine segment width expansion or narrowing. In various embodiments, detection of each of segment width expansion and segment width narrowing involves a width expansion measure and a width narrowing measure, respectively. The width expansion measure may refer to a relative measure configured to quantify or represent an extent to which the segment width has expanded, while the width narrowing measure may refer to a relative measure configured to quantify or represent an extent to which the segment width has narrowed. Further, in various embodiments, operation 312 comprises evaluating a determined width expansion measure against one or more configurable thresholds to automatically detect whether the width of the segment has expanded to a significant extent, and operation 314 comprises evaluating a determined width narrowing measure against one or more configurable thresholds to automatically detect whether the width of the segment has narrowed to a significant extent.

In some example embodiments, the width expansion measure may be determined according to Equation 1, in which $Ls_{mean}$ represents the average lateral positions of the clusters in the subject probe data, $Lh_{mean}$ represents the average lateral positions of the clusters in the historical probe data, $Lh_{std}$ represents the standard deviation of the lateral positional indicators in the historical probe data, and K represents the number of clusters, which may be the same in the historical probe data and in the subject probe data.

$$W_{expand} = \frac{(\max[Ls_{mean}] - \max[Lh_{mean}])/Lh_{std} - (\min[Ls_{mean}] - \min[Lh_{mean}])/Lh_{std}}{K} \quad \text{Equation 1}$$

Thus, in Equation 1, the maximum of $Ls_{mean}$ then represents the average lateral position of one width-defining cluster of the subject probe data (e.g., the right-most cluster or cluster 502D in FIG. 5A), while the minimum of $Ls_{mean}$ then represents the average lateral position of the other width-defining cluster of the subject probe data (e.g., the left-most cluster or clusters 502A in FIG. 5A). In a similar fashion, the maximum of $Lh_{mean}$ then represents the average lateral position of one width-defining cluster of the historical probe data (e.g., the right-most cluster or cluster 500D in FIG. 5A), while the minimum of $Lh_{mean}$ then represents the average lateral position of the other width-defining cluster of the subject probe data (e.g., the left-most cluster or clusters 500A in FIG. 5A). Accordingly, the width expansion measure $W_{expand}$ is based at least in part on the statistical measures of the width-defining clusters of historical probe data and subject probe data.

With determination of the width expansion measure via comparison of the statistical measures of the historical width-defining clusters and the statistical measures of the subject width-defining clusters (e.g., in accordance with Equation 1), the width expansion measure can be evaluated with respect to one or more configurable thresholds to determine whether the segment width has expanded, in operation 312 as described. That is, while the width expansion measure may be representative of the extent to which the road segment has expanded with respect to its width-defining lanes, the one or more configurable thresholds may be used to control the significant extent of width expansion that may be alerted to a driver, a navigation system, an autonomous driving system, and/or the like. In various embodiments, the one or more configurable thresholds may be manually defined and/or optimized. Alternatively, determining whether the width of the segment has expanded may involve using a machine learning model with the width expansion measure to classify the significance of the width expansion measure (e.g., based at least in part on other samples of width expansion measures).

Referring next to FIG. 5B, additional example historical clusters 500 and subject clusters 502 are provided on a horizontal axis plotting the frequency of probes 400 by their d-values, or lateral positional indicators. Specifically, FIG. 5B illustrates four example historical clusters 500W-Z and four example subject clusters 502W-Z. It may be generally observed that FIG. 5B demonstrates an example of segment width narrowing, as the lateral distribution of the subject clusters 502 (representative of lanes of the segment) along the horizontal axis has a narrower range than the lateral distribution of the historical clusters 500. As such, FIG. 5B may contrast with FIG. 5 which previously demonstrated an example of segment width expansion, with subject clusters 502 having a wider lateral distribution than historical clusters 500. In FIG. 5B, subject clusters 502A and 502D may be identified as the two width-defining clusters within the subject probe data, while historical clusters 500A and 500D may be identified as the two width-defining clusters within the historical probe data.

To then determine whether the width of the segment has narrowed (in operation 314), the width narrowing measure may be determined according to Equation 2. In Equation 2, $Ls_{mean}$ represents the average lateral positions of the clusters in the subject probe data, $Lh_{mean}$ represents the average lateral positions of the clusters in the historical probe data, $Lh_{std}$ represents the standard deviation of the lateral positional indicators in the historical probe data, and K represents the number of clusters, which may be the same in the historical probe data and in the subject probe data.

$$W_{narrow} = \frac{(\max[Ls_{mean}] - \max[Lr_{mean}])/Lh_{std} - (\min[Lh_{mean}] - \min[Lr_{mean}])/Lh_{std}}{K} \quad \text{Equation 2}$$

Thus, in Equation 2, the maximum of $Ls_{mean}$ then represents the average lateral position of one width-defining cluster of the subject probe data (e.g., the right-most cluster or cluster 502Z in FIG. 5B), while the minimum of $Ls_{mean}$ then represents the average lateral position of the other width-defining cluster of the subject probe data (e.g., the left-most cluster or clusters 502W in FIG. 5B). In a similar fashion, the maximum of $Lh_{mean}$ then represents the average lateral position of one width-defining cluster of the historical probe data (e.g., the right-most cluster or cluster 500Z in FIG. 5B), while the minimum of $Lh_{mean}$ then represents the average lateral position of the other width-defining cluster of the subject probe data (e.g., the left-most cluster or cluster 500W in FIG. 5B). Accordingly, the width narrowing measure Wnarrow is based at least in part on the statistical measures of the width-defining clusters of historical probe data and subject probe data. Generally, each of $Ls_{mean}$ and $Lh_{mean}$ are statistical measures for the clusters of historical probe data and subject probe data.

Accordingly, in operation 314, the width narrowing measure may be compared or evaluated against one or more configurable thresholds in order to determine whether the width of the segment has narrowed (e.g., significantly enough to warrant an alert, notification, or further action). The thresholds used in operation 314 may be the same thresholds used to determine whether a width of the segment has expanded. For example, the width narrowing measure and the width expansion measure may have the same relative scale, and the same thresholds may be used to detect significant magnitude in each of the width narrowing measure and the width expansion measure. Alternatively, separate thresholds may be defined for each of the width narrowing measure and the width expansion measure. In some examples, for instance, a lower threshold may be configured for the width narrowing measure in order for more sensitive detection of segment width narrowing. As discussed, operation 314 may comprise using a machine learning model to classify a significance of the width narrowing measure based at least in part on trained samples of width narrowing measures, in some example embodiments.

With having determined whether the segment width has expanded or has narrowed, the flowchart continues to operation 316. In operation 316, apparatus 200 includes means, such as processing circuitry 22, memory 24, and/or the like for providing an indication of whether the segment has been expanded or narrowed. In various embodiments, the indication may be an alert provided to a driver indicating that an upcoming segment has expanded or narrowed. In various embodiments, the indication may be provided to a map database or a mapping system configured to update map data associated with the segment in order to reflect the determined width expansion or narrowing. In various embodiments, the indication may comprise the width expansion measure and/or the width narrowing measure explicitly and/or may describe the extent or magnitude of the width expansion or narrowing. For instance, the apparatus 200 may be configured to determine a width change measurement from the width expansion measure and/or the width narrowing measure, such that the magnitude of width expansion or narrowing can be quantifiably described. It will be appreciated that provision of the indication may be conditional upon a positive determination of width expansion or a positive determination of width narrowing. For example, if it is determined that the segment width has not expanded or narrowed (e.g., based at least in part on the width expansion measure and the width narrowing measure not satisfying the configurable thresholds), then the indication may not be provided.

Therefore, various example operations for automatically detecting a width change of a particular road segment using probe data has been described in FIG. 3. Various further embodiments of the present disclosure may adapt such example operations or include other example operations to detect significant width differences between different road segments. For instance, rather than comparing width-defining portions of historical probe data to width-defining portions of subject probe data for the same segment to determine width change of the segment, width-defining portions of probe data for a first segment can be compared with width-defining portions of probe data for a second segment in accordance with various embodiments described herein to determine whether the width of the second segment is significantly wider or narrower than the width of the first segment (and vice versa). For example, a width expansion measure and/or a width narrowing measure can be determined (e.g., in the spirit of Equation 1 and Equation 2) to quantify the extent of the width difference between the first segment and the second segment, and with configurable thresholds, a determination of width difference (e.g., wider width, narrower width) can be performed. Indications of such width differences may be provided to drivers, in some examples, to warn of upcoming narrow road segments or to inform of upcoming wider road segments.

According to example embodiments provided herein, by using probe data, apparatus 20 may automatically determine real-time or near real-time segment width changes—specifically width expansions and width narrowings. Example embodiments may be economically scalable across a vast array of geographic areas regardless of technological infrastructure, or independent of further infrastructure development, due to probe data being relatively inexpensive and widely available. Many telecommunications and information exchanges are currently deployed world-wide to enable the purchase of and/or access to probe data, such as those used to track general segment-level traffic volumes, speeds, or conditions.

Alternative attempts to determine segment width changes may rely on expensive technological infrastructure such as light detection and ranging (LIDAR) systems, other remote sensing systems and/or computer vision systems. In some cases, implementation of such equipment and systems on every segment for which width change monitoring and detection is desired may be unfeasible. In any event, example embodiments conserve processing and memory resources that would otherwise be expended to operate such equipment and systems, even if deployed, along segments for which width change monitoring and detection are desired.

Accordingly, as described herein, the method, apparatus 20, and computer program product of certain embodiments may leverage readily available probe data for a reasonable and feasible cost, and in a meaningful way, to automatically detect width expansion and width narrowing of road segments for drivers and/or other applications (e.g., updating of map data). Whereas raw GPS signals and/or probe data considered in isolation or in small quantities may not provide requisite precise positional accuracy or may be too noisy to infer accurate width changes, utilizing historic probe data to establish baseline patterns including lateral distributions of at least width-defining lanes of segments, and comparing real-time or near real-time probe data thereto enables the method, apparatus 20, and computer program product of certain embodiments to automatically detect segment width changes that are useful for drivers, traffic reporting applications, and/or the like. Example embodiments therefore provide an improvement to the use of probe data to provide a meaningful information in the form of detected segment width expansion and narrowing.

FIG. 3 illustrates a flowchart depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus 20 employing an embodiment of the present invention and executed by the processing circuitry 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least processing circuitry and at least one non-transitory memory including computer program code instructions, the computer program code instructions configured to, when executed by the processing circuitry, cause the apparatus to:
receive subject probe data comprising at least location information of a plurality of vehicles in real-time;
partition the subject probe data associated with a segment into a number of clusters with respect to a lateral dimension of the subject probe data using a clustering algorithm;
identify two width-defining clusters within the subject probe data, wherein the two width-defining clusters comprise a first cluster associated with a maximum average lateral position and a second cluster associated with a minimum average lateral position;
determine a width narrowing measure for the segment based at least in part on comparing statistical measures for the two width-defining clusters within the subject probe data to statistical measures for corresponding clusters within historical probe data associated with the segment; and
provide an indication of whether a width of the segment has been narrowed according to the width narrowing measure to be rendered as an alert at a graphical interface of a device of a driver.

2. The apparatus of claim 1, wherein the historical probe data is partitioned into a second number of clusters with respect to the lateral dimension of the subject probe data.

3. The apparatus of claim 2, wherein the second number of clusters is the same as the number of clusters into which the subject probe data is partitioned.

4. The apparatus of claim 1, wherein the corresponding clusters within the historical probe data are width-defining clusters for the historical probe data associated with a minimum average lateral position within the historical probe data and a maximum average lateral position within the historical probe data.

5. The apparatus of claim 1, wherein the indication that the width of the segment has been narrowed is provided based at least in part on the width narrowing measure satisfying a configurable threshold.

6. The apparatus of claim 1, wherein the computer program code instructions are further configured to, when executed by the processing circuitry, cause the apparatus to:
partition second probe data associated with a second segment adjacent to the segment into a second number of clusters;
wherein the second number of clusters is the same as the number of clusters into which the subject probe data is partitioned; and
determine whether the second segment has a narrower width than the segment based at least in part on a second width narrowing measure determined for the second segment.

7. The apparatus of claim 1, wherein the width narrowing measure is determined in real-time or near real-time relative to receipt of the subject probe data.

8. The apparatus of claim 1, wherein the historical probe data is collected within a historical time period while the subject probe data is collected within a subject time period, the historical time period and the subject time period spanning the same amount of time.

9. The apparatus of claim 1, wherein the clustering algorithm comprises a k-means algorithm.

10. A computer program product comprising at least one non-transitory computer-readable storage medium having computer-executable program code instructions stored therein, the computer-executable program code instructions comprising program code instructions to:
receive subject probe data comprising at least location information of a plurality of vehicles in real-time;
partition the subject probe data associated with a segment into a number of clusters with respect to a lateral dimension of the subject probe data using a clustering algorithm;
identify two width-defining clusters within the subject probe data, wherein the two width-defining clusters comprise a first cluster associated with a maximum average lateral position and a second cluster associated with a minimum average lateral position;
determine a width narrowing measure for the segment based at least in part on comparing statistical measures for the two width-defining clusters within the subject probe data to statistical measures for corresponding clusters within historical probe data associated with the segment; and
provide an indication of whether a width of the segment has been narrowed according to the width narrowing measure to be rendered as an alert at a graphical interface of a device of a driver.

11. The computer program product of claim 10, wherein the historical probe data is partitioned into a second number of clusters with respect to the lateral dimension of the subject probe data.

12. The computer program product of claim 11, wherein the second number of clusters is the same as the number of clusters into which the subject probe data is partitioned.

13. The computer program product of claim 10, wherein the corresponding clusters within the historical probe data are width-defining clusters for the historical probe data associated with a minimum average lateral position within the historical probe data and a maximum average lateral position within the historical probe data.

14. A method comprising:
receiving subject probe data comprising at least location information of a plurality of vehicles in real-time;
partitioning the subject probe data associated with a segment into a number of clusters with respect to a lateral dimension of the subject probe data using a clustering algorithm;
identifying two width-defining clusters within the subject probe data, wherein the two width-defining clusters comprise a first cluster associated with a maximum average lateral position and a second cluster associated with a minimum average lateral position;
determining a width narrowing measure for the segment based at least in part on comparing statistical measures for the two width-defining clusters within the subject probe data to statistical measures for corresponding clusters within historical probe data associated with the segment; and
providing an indication of whether a width of the segment has been narrowed according to the width narrowing measure to be rendered as an alert at a graphical interface of a device of a driver.

15. The method of claim 14, wherein the historical probe data is partitioned into a second number of clusters with respect to the lateral dimension of the subject probe data.

16. The method of claim 15, wherein the second number of clusters is the same as the number of clusters into which the subject probe data is partitioned.

17. The method of claim 14, wherein the corresponding clusters within the historical probe data are width-defining clusters for the historical probe data associated with a minimum average lateral position within the historical probe data and a maximum average lateral position within the historical probe data.

* * * * *